Dec. 26, 1967          G. F. MARSHALL          3,360,672
PARALLEL LIGHT FIBERS WITH LONGITUDINAL AXES MAKING
OBLIQUE ANGLE WITH DISPLAY SURFACE
OF CATHODE RAY TUBES
Filed Jan. 21, 1966
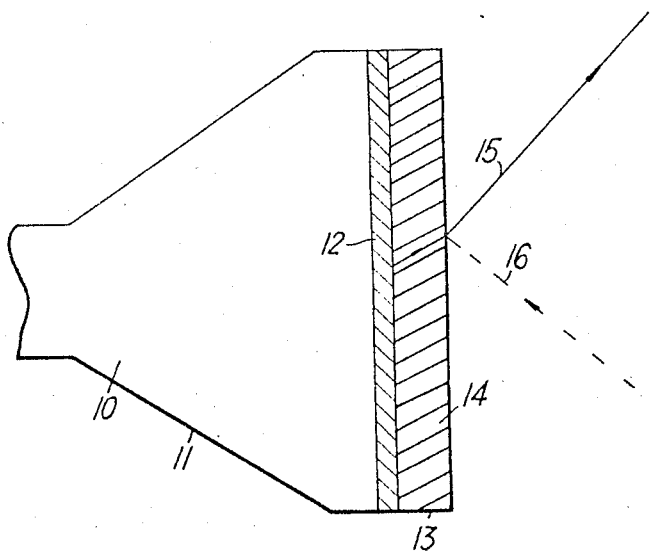
INVENTOR
G. F. MARSHALL
BY Cameron, Kerkam & Sutton
ATTORNEYS //United States Patent Office 3,360,672
Patented Dec. 26, 1967

3,360,672
PARALLEL LIGHT FIBERS WITH LONGITUDINAL AXES MAKING OBLIQUE ANGLE WITH DISPLAY SURFACE OF CATHODE RAY TUBES
Gerald Francis Marshall, Edinburgh, Scotland, assignor to Ferranti, Limited, Hollinwood, England, a company of Great Britain and Northern Ireland
Filed Jan. 21, 1966, Ser. No. 522,134
Claims priority, application Great Britain, Jan. 26, 1965, 3,333/65
2 Claims. (Cl. 313—92)

ABSTRACT OF THE DISCLOSURE

A plurality of light transmitting fibers are arranged with their longitudinal axis substantially parallel to each other and inclined at an oblique angle to at least the viewing surface of a display screen formed by the optical fibers.

This invention relates to display screens of the type having front and back surfaces, on the back surface of which an optical image may be formed for observation through the front surface.

In this specification the term "observer" is taken to indicate not only a human observer, but also indirect means such as television and photographic cameras.

One of the main problems which arises when using display screens of the type referred to above is that of specular reflection of ambient light falling on the front surface of the screen. This problem may be overcome by making the front surface of the screen non-reflective. However, it is often found necessary to protect the screen with a layer of transparent material such as glass or plastic, and reflections are then produced from the surface of this protective layer.

According to the present invention there is provided a display screen having front and back surfaces, on the back surface of which an optical image may be formed for observation through the front surface, said screen comprising a plurality of light-transmitting fibres arranged with their longitudinal axes substantially parallel to one another, each fibre consisting of a core of substantially transparent material coated over its longitudinal surface with a material having a refractive index lower than that of said transparent material, said plurality of fibres being arranged with their longitudinal axes inclined at an oblique angle to at least the viewed surface of said screen such that an image is viewable through the front surface of said screen.

The invention will now be described with reference to the accompanying drawing which shows a sectional side elevation of part of a cathode-ray tube incorporating the invention.

Referring now to the drawing, a cathode-ray tube 10 has a conventional envelope 11 with a layer of phosphor 12 adjacent to the face-plate 13. This face-plate 13 is made up of a very large number of short optical fibres 14, shown exaggerated in size for clarity, arranged with their axes parallel to one another and at an angle to the two surfaces of the face-plate. The obliquity of the fibres has also been exaggerated. The method of construction of such a face-plate is not the subject of this invention, since it is very similar to the method used to make face-plates in which the axes of the fibres are perpendicular to the surfaces of the face-plate. Any of the known methods of producing the fibres 14 is suitable, most commonly each fibre consists of a core of glass or a similar material having a high refractive index coated with a layer of glass or similar material having a refractive index lower than that of the core material. There are many variations and modifications which may be used, for example the core of each fibre may be made from a phosphor material. The construction of the fibres is not shown in the drawing.

The operation of the display screen is as follows. An optical image is formed by the phosphor and hence appears on the inner surface of the face-plate. Light travels along the fibres 14 to the front surface of the face-plate where the angle of the end of each fibre produces the effect of a prism. Thus the rays of light 15 emerge from the face-plate at a more oblique angle than the inclination of the fibres. It is necessary to view the image along a direction substantially parallel to the emergent rays of light 15. Ambient light falling on the front surface of the face-plate from any direction except that shown at 16 will be reflected away from the field of view. This applies especially to light reflected from an observer's face which is often the cause of reflections when viewing the screen along a normal to its surface.

Frequently, when the screen forms the face-plate of a cathode-ray tube it is covered with a layer of plain glass to ensure vacuum-tightness. Reflections from the glass layer are reduced in the same way by virtue of the oblique viewing, and if the glass layer is thin no appreciable distortion of the image will occur.

Although the above description refers to a face-plate for a cathode-ray tube the screen described may be used equally well for simple optical projection. As before an optical image is produced on the rear surface of the screen and is transmitted along the fibres 14.

If the two opposite surfaces of the screen 13 are parallel there will be no distortion of the image. If, however, the two surfaces are not parallel the image will be distorted, this distortion being in the form of foreshortening, or lengthening, in the direction of inclination of the fibres. Preferably, therefore, the two surfaces are made parallel to one another.

If it is preferred to view the image on the screen in a direction substantially normal to the surface of the screen a prism may be used to compensate for the obliquity of the light rays emerging from the screen. The prism itself also reduces specular reflections from the viewed surface of the screen.

The angle of inclination of the fibres to the front face of the tube is arranged so as to reduce specular reflection to a minimum, this depending upon the conditions under which the screen is to be used.

What I claim is:
1. A display screen for a cathode-ray tube comprising a plurality of light transmitting fibres arranged with their longitudinal axes substantially parallel to one another, each fibre consisting of a core of substantially transparent material coated over its longitudinal surfaces with a material having a refractive index lower than said transparent material, said plurality of fibres terminating at one end to form a front surface in a viewing plane normal to the horizontal axis of the cathode-ray tube and at the other end to form a back surface substantially parallel to the front surface, a phosphor layer on the back surface by which an optical image may be formed for observation through the front surface, said plurality of fibres being arranged with their longitudinal axes inclined at an oblique angle to the front surface of the display screen such that an image is viewable through the front surface of said screen.

2. A display screen as claimed in claim 1 in which the core of each of said fibres is made of an optically transparent phosphor material.

References Cited

UNITED STATES PATENTS

| 2,091,152 | 8/1937 | Malpica | 313—92 X |
| 3,237,039 | 2/1966 | Fyler | 313—92 |
| 3,255,003 | 6/1966 | Hays | 313—92 X |
| 3,311,773 | 3/1967 | Turner | 313—92 |

ROBERT SEGAL, *Primary Examiner.*